United States Patent [19]

Naaktgeboren et al.

[11] Patent Number: 4,835,953
[45] Date of Patent: Jun. 6, 1989

[54] DRIVE NEUTRALIZING MEANS FOR HEADER REEL FOR AGRICULTURAL MACHINE

[75] Inventors: Adrianus Naaktgeboren; Jan R. Van Steelant; Frans J. G. C. Decoene, all of Zedelgem, Belgium

[73] Assignee: Ford New Holland, Inc., New Holland, Pa.

[21] Appl. No.: 162,704

[22] Filed: Mar. 1, 1988

[30] Foreign Application Priority Data

Mar. 2, 1987 [EP] European Pat. Off. ...... 87.200.366.0

[51] Int. Cl.$^4$ ............................................. A01D 57/03
[52] U.S. Cl. ......................................... 56/226; 56/220
[58] Field of Search ..................... 56/14.6, 219–227

[56] References Cited

U.S. PATENT DOCUMENTS 4,751,809  6/1988  Fox et al. ................................ 56/220

FOREIGN PATENT DOCUMENTS

| 137178 | 8/1979 | Fed. Rep. of Germany ........ | 56/226 |
| 869650 | 10/1981 | U.S.S.R. ................... | 56/226 |
| 965390 | 10/1982 | U.S.S.R. ................... | 56/219 |
| 1063315 | 10/1984 | U.S.S.R. | |
| 1138070 | 2/1985 | U.S.S.R. ................... | 56/220 |

Primary Examiner—John Weiss
Attorney, Agent, or Firm—Larry W. Miller; Frank A. Seemar; Darrell F. Marquette

[57] ABSTRACT

A header for an agricultural machine having a cutterbar, an auger and a rotatable reel, the reel having a main axis of rotation around which the reel is rotated in one direction, crop-engaging members being rotatably mounted on the reel around respective pivot axes disposed around the main shaft, is disclosed wherein inclination control means including steering means positioned eccentrically of the main axis are operable, during rotation of the reel in said one direction, to rotate the crop-engaging members around the respective pivot axes in the opposite direction so as to maintain the crop-engaging members at a fixed positional inclination relative to the horizontal so that the free ends of the crop-engaging members define a circularly shaped locus. Drive means are associated with the steering means for oscillating said steering means during rotation of the reel such that the crop-engaging members equally are oscillated back-and-forth around their respective further pivot axes on the reel and the locus defined by the path of movement of the free ends of the crop-engaging members deviates from said circular shape. Means are also provided for neutralizing said drive means associated with the steering means so that the reel may be operated with either a circular or a non-circular locus.

16 Claims, 8 Drawing Sheets

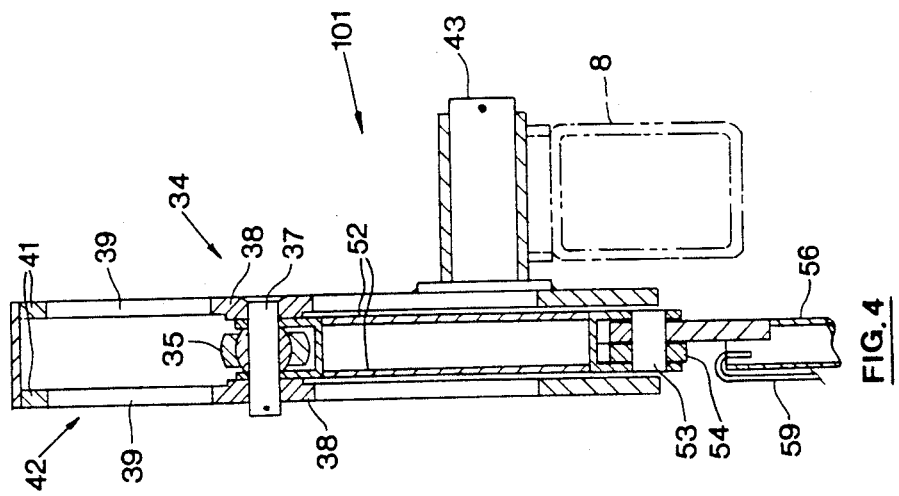
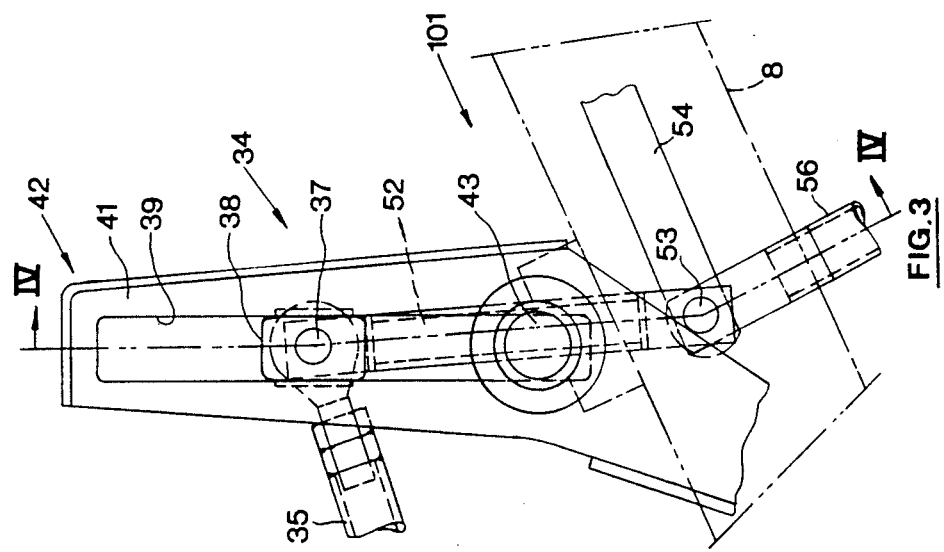

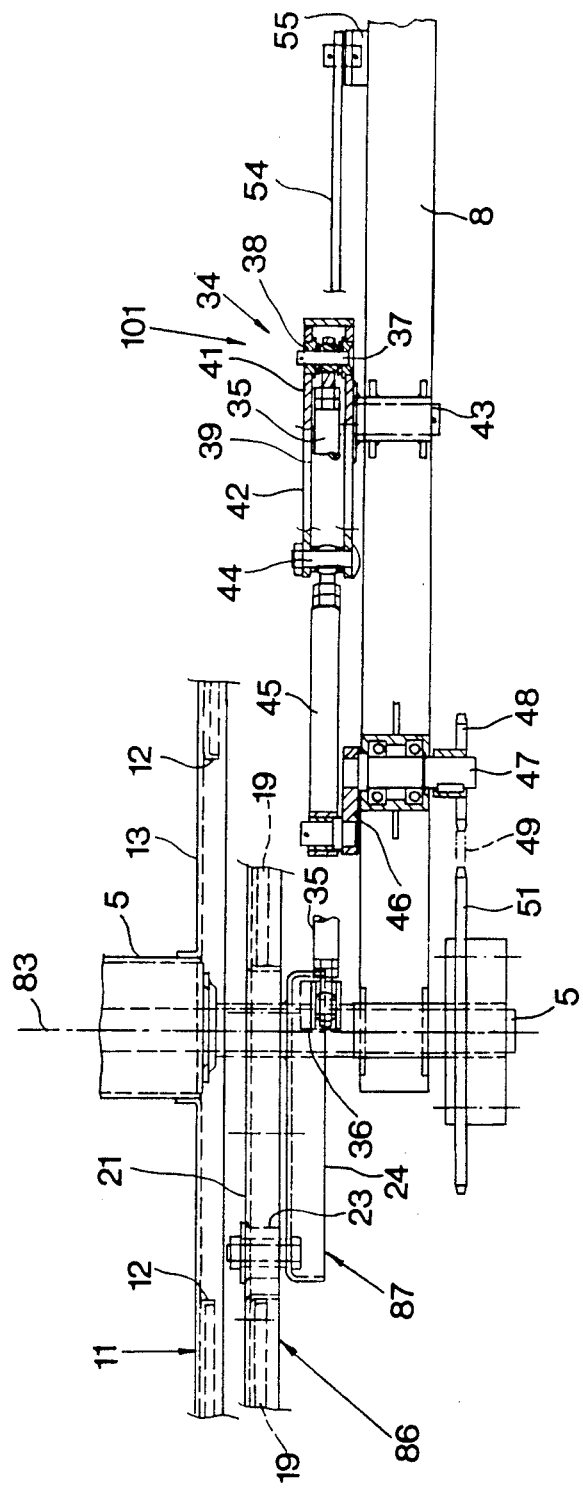

DRIVE NEUTRALIZING MEANS FOR HEADER REEL FOR AGRICULTURAL MACHINE

BACKGROUND OF THE INVENTION

This invention relates generally to headers for agricultural machines, such as a combine harvester and, more specifically, to improvements in the crop conveying reel provided on such headers.

Conventionally, a header for an agricultural machine comprises a cutterbar operable to cut standing crop, an auger which receives the cut crop material and normally feeds it to a central opening through which the severed crop material passes to be processed by the machine to which the header is fitted, and a rotatable reel mounted generally above the cutterbar and operable to sweep standing crop towards the cutterbar and then to transport the cut crop material over the cutterbar to the auger. The reel normally comprises a plurality of circumferentially spaced, transversely extending tine bars from which project tines along the length thereof, the tine bars being mounted on and supported from the ends of spider arms spaced along the reel for rotation about the main axis of the reel. If no other mechanism were employed, the tines of each tine bar would rotate in a fixed orientation relative to the axis of rotation during each revolution of the reel; however, it is desirable to control the movement of the tines such that they maintain a constant orientation with respect to the ground as the reel rotates, primarily to prevent the tines from carrying cut crop material over the top of the reel, as opposed to disengaging or withdrawing from the cut crop material as the latter reaches the vicinity of the auger.

To this end, the tine bars have been made rotatable about their respective own axes on the reel and have been connected at their ends by respective crank arms to second spiders which are held offset from the first spiders. In operation, the reel including the first spiders are driven about the main axis which in turn drives the second spiders around an offset axis through the intermediary of the crank arms in a manner such that the tine bars are rotated about their respective own axes in a direction opposite to that of the reel and by an equal amount, whereby the tines are maintained in a given orientation relative to the ground which is set by adjusting the position of the offset axis of the second spiders relative to the main axis of the reel.

With this conventional arrangement, the tips of the tines describe a circular path which can be positioned relative to the cutterbar by adjusting, usually through the use hydraulic cylinders, the reel in both a generally vertical direction and in a generally horizontal direction. Ideally, the reel is adjusted so that the tine path lies closely adjacent and above the cutterbar as well as closely adjacent the forward edge of the auger on the other hand. However, this ideal positioning may be adversely affected if the reel is moved forwardly and downwardly which is advantageous in order to let the tines pick up down crop forwardly of the cutterbar, i.e. crop which is no longer standing upright due to inclement weather, for example.

In Soviet Union Patent Application No. SU-A-1063315, there is disclosed a reel for a combine harvester which basically is of the same type as described above but which includes a modification whereby the second or offset spiders are moved by a crank mechanism so as to vary the tine orientation during reel rotation with a view to minimizing crop losses due to flattened or down crop not being lifted by the tines for cutting by the cutterbar. This particular modification concentrates on the problem of harvesting down crop and does not address the related problems of maintaining optimum spacing between reel and cutterbar, and of transporting cut crop to the auger.

SUMMARY OF THE INVENTION

Accordingly, it is an object of the present invention to provide a reel for a header on an agricultural machine which has an optimal tine path and tine orientation from the standpoints of crop engagement prior to cutting, reel/cutterbar spacing, and crop transportation to the auger after cutting.

According to the instant invention, there is provided a header for an agricultural machine having a cutterbar operable to cut standing crop; a rotatable reel having a transverse shaft defining the rotational main axis thereof and including a plurality of crop-engaging members rotatably mounted thereon about respective further axes disposed around the main shaft; a first drive mechanism for rotatably driving the reel in one direction; an inclination control mechanism including a steering apparatus and being operable, during rotation of the reel in the one direction, to rotate the crop-engaging members around the respective further axes in the opposite direction so as to maintain the crop-engaging members in a fixed orientation relative to the ground such that the free ends of the crop-engaging members define a circularly shaped locus; and a second drive mechanism associated with the steering apparatus for oscillating the steering apparatus during rotation of the reel to oscillate the crop-engaging members around their respective further pivot axes on the reel so that the locus defined by the free ends of the crop-engaging members deviates from a circular shape.

This oscillation of the steering apparatus by the second drive mechanism enables the crop-engaging members to be oriented and displaced so as to follow an optimal path of movement to permit the reel to optimally perform each of the following functions: the lifting of any down crop; the supporting of the engaged crop close to the cutterbar for cutting, the transporting of the cut crop from the cutterbar to the auger and the disengaging of the cut crop immediately adjacent the auger.

However, while the optimum orientation of the crop-engaging members to meet all of the primary requirements referred to above is needed from time to time, such an orientation is not necessarily permanently required. For example, when normal upstanding crop is being harvested, it is sufficient to operate the reel with the outer ends of the crop-engaging members describing the normal circular locus because this is adequate to achieve a generally satisfactory presentation to the cutterbar of the standing crop and transportation of the cut crop material over the cutterbar to the auger.

In accordance with the present invention, a header of the type as identified above and having an inclination control mechanism including a steering apparatus for controlling the positional inclination of the crop-engaging members of the reel and also having a drive mechanism associated with the steering apparatus for oscillating the crop-engaging members around their pivotal mountings on the reel is disclosed wherein a mechanism for neutralizing the drive mechanism is associated with the steering apparatus so that the steering apparatus can be rendered selectively operative when crop conditions demand, thereby saving power and reducing component wear when selectively rendered inoperative.

The mechanism for neutralizing the drive mechanism may be formed by a disengageable coupling apparatus provided within the drive mechanism, such that, when the coupling apparatus is disengaged, the steering apparatus is positionable in a fixed position. The coupling apparatus may be operable either manually or automatically. In case of automatic operation, operation of the coupling apparatus may be effected by the raising and lowering of the reel relative to the cutterbar, such that, as the reel is raised from its lowermost operative position, the coupling apparatus is disengaged and the steering apparatus is positioned in a fixed nominal position and, as the reel is lowered toward its lowermost operative position, the coupling apparatus is engaged to permit the aforementioned drive means to oscillate the steering apparatus.

The principles of the present invention may also be realized by the combination wherein the drive mechanism includes a linkage mechanism incorporating an oscillating member mounted for oscillatory movement on the header and arranged to be oscillated in synchronism with the rotation of the reel, and a link connected between the oscillating member and the steering apparatus of the inclination control mechanism; and the neutralizing mechanism includes a slide which is slidably coupled relative to the oscillating member and which accomodates a pivot by which one end of the link is attached thereto thus adjustably coupling the link to the oscillating member, such that, when the slide pivot is offset from the rocking pivot of the oscillating member, the drive mechanism is made operative and, when the slide pivot is aligned with said rocking pivot of the oscillating member, the drive mechanism is neutralized.

BRIEF DESCRIPTION OF THE DRAWINGS

The advantages of the instant invention will become apparent upon consideration of the following detailed disclosure of the invention, especially when taken in conjunction with the accompanying drawings wherein:

FIG. 3 is an enlarged detail view of a portion of the header shown in FIG. 2 with the components in different relative positions;

FIG. 4 is a cross-sectional view along line IV—IV of FIG. 3;

FIG. 5 is a partial cross-sectional view of the header shown in FIG. 1 taken in the direction of arrow V;

DETAILED DESCRIPTION OF THE PREFERRED EMBODIMENT

Figure 1:
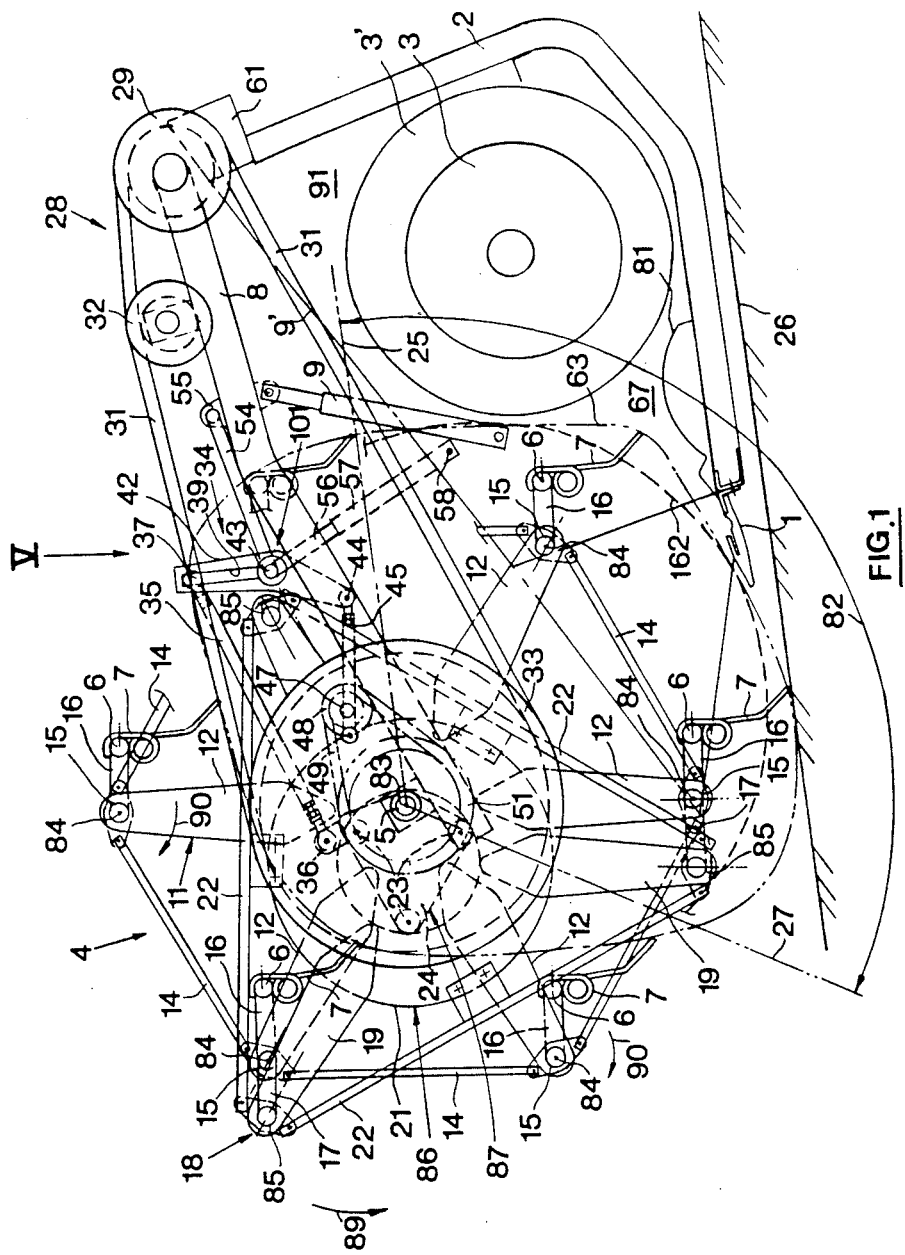
FIG. 1 is a schematic side elevational view of a header incorporating the principles of the instant invention and being adapted for use in combination with an agricultural machine such as a combine harvester, portions of the header being broken away for the sake of clarity.

Referring first praimarily to FIGS. 1 to 5, a header typically employed on crop harvesting machine commonly referring to as a combine harvester (not shown) can best be seen. The terms "forward", "rearward", "fore-and-aft", "transverse", "left", "right", ect. used in connection with a conventional combine harvester and/or components thereof, are determined by standing at the rear of the machine facing the forward end, the direction of forward operative travel of the combine harvester, but the relative terms should not be considered as limiting. The header is provided with a cutterbar 1 which is mounted on a header frame 2, the latter further also supporting an auger 3 having oppositely directed flights 3' at respective ends for feeding cut crop material to a central outlet (not shown) in the header through which the crop material passes for processing by the combine harvester.

The cutterbar 1 conventionally is mounted at a distance forwardly of the auger 3. A header floor 81 shaped in a particular manner as is conventional extends rearwardly from the cutterbar 1 and beneath the auger 3. The header floor 81 and the auger 3 define a generally triangularly shaped crop transfer zone 67 therebetween.

The header is also provided with a reel 4 mounted for rotation about the axis 83 of a main shaft 5, which is typically a tube carrying a stub shaft at each end. The reel 4 includes six crop-engaging members in the form of tine bars 6, equally spaced around the main shaft 5 and each having a pluarality of spring tines 7 extending therealong. The reel 4 is mounted between the generally forward ends of two arms 8, the rearward ends of which are pivotally attached to the header frame 2 and which can be raised and lowered, together with the reel 4, by respective hydraulic cylinders 9.

The main shaft 5 carries at each end a spider 11 having six radial arms 12 equispaced around, and connected at one end to, a ring 13 which itself rigidly is attached to said main shaft 5. The radial arms 12 arm interconnected at their other ends by chord arms 14. A plurality of intermediate spiders (not shown) of similar form as the end spiders 11 also are provided. The radial arms 12 of each spider 11 rotatably carry at their outer ends stub shafts 15. Crank arms 16 are connected at one end to the inwardly facing ends of the stub shafts 15 associated with the outer spiders 11 and to the respective opposite ends of the stub shafts 15 associated with the intermediate spiders. The other ends of corresponding adjacent crank arms 16 are interconnected by tine bar sections 6 in a manner so as to define the aforementioned six crop-engaging members 6, 7 which extend across the full width of the reel 4 at equiangular intervals around the circumference of said reel 4 and in offset relationship relative to the outer ends of the spider arms 12. Said crop-engaging members 6, 7 thus are mounted on the outer ends of the spider arms 12 for rotational movement around the axes 84 defined by the stub shafts 15.

Alternate crop-engaging members 6, 7 each comprising a plurality of tine bar sections 6, have a further crank arm 17 coupled to the outwardly facing ends of the associated stub shaft 15 rotatably mounted on one end spider 11. The other crop-engaging members 6, 7 have a similar further crank arm 17 coupled to the outwardly facing ends of the associated stub shafts 15 rotatably mounted on the opposite end spider 11. Thus three further carank arms 17 are associated with each spider 11.

Inclination control means 86 for the crop-engaging members 6, 7 are provided and include an eccentric spider 18 associated with each one of the outer spiders 11. Each eccentric spider 18 comprises three radial arms 19 which are equally spaced around a flanged ring 21 which itself is mounted concentrically with each eccentric spider 18; the axis of rotation of which is offset from that of the main shaft 5. The eccentric spider radial arms 19 are interconnected at their outer ends by chord arms 22 and further alsos rotatably receive futher stub shafts 85 connected to the free ends of corresponding further crank arms 17. Thus the crop-engaging members 6, 7 are split into two sets of three members which are associated with respective eccentric spiders 18.

The inclination control means 86 further comprise, at each transverse end of the reel 4, a steering means 87 in the form of a set of three rollers 23 mounted on a generally triangular plate 24 which itself is mounted for oscillating movement around the main axis 83 at a point offset from its center, whereby the plate 24 acts as a crank arm. The interior of each flanged ring 21 is arranged to be supported on the three rollers 23 of the associated plate 24.

Figure 2:
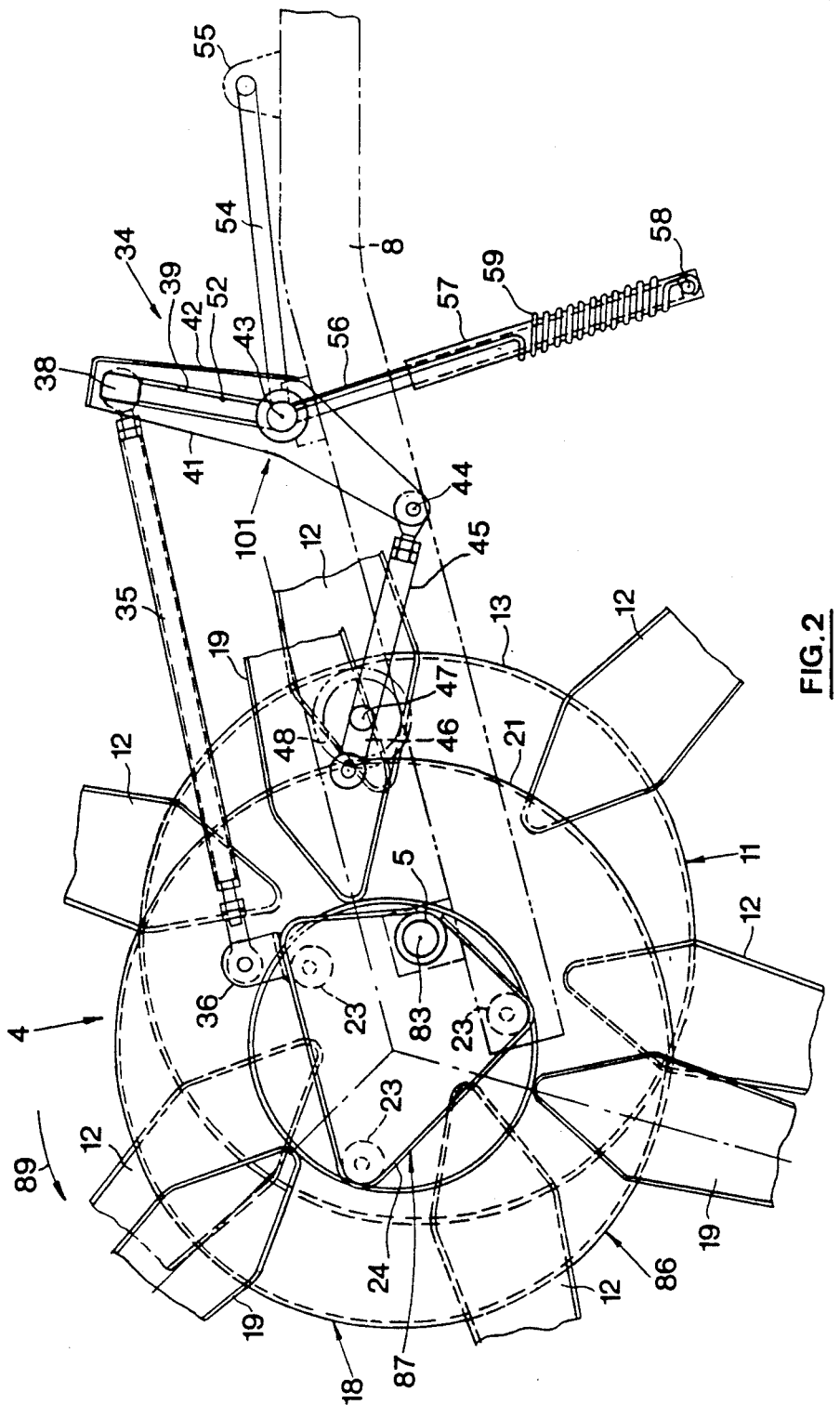
FIG. 2 is an enlarged detail view of a portion of the header shown in FIG. 1.

Only one eccentric spider 18 and associated steering means 87 in the form of said plate 24 with the three rollers 24 thereon, is shown in the FIGS. 1, 2 and 5. However, as already said, two eccentric spiders 18 and associated steering means 87 are provided with the two steering means 87 being angularly offset from each other, when seen in side view of the header and relative to the main axis 83, so that successive crop-engaging members 6, 7 are presented in the correct manner, as will be described, over their operative arc of operation 82 relative to the cutterbar 1 and the auger 3. The operative arc 82 of the tine bars 6 in defined as the arc over which the tine bars 6 are moved when the associated tines 7 generally commence engaging crop material close to the ground 26 until said tines 7 finally generally disengage out crop material as will be described in greater detail hereinafter. In as much as each eccentric spider 18 controls the position of only three crop engaging members 6, 7 the latter are spaced 120 degree apart and this basically corresponds to the angular dimension of the operative arc 82 of the crop-engaging members 6, 7.

Figure 7:
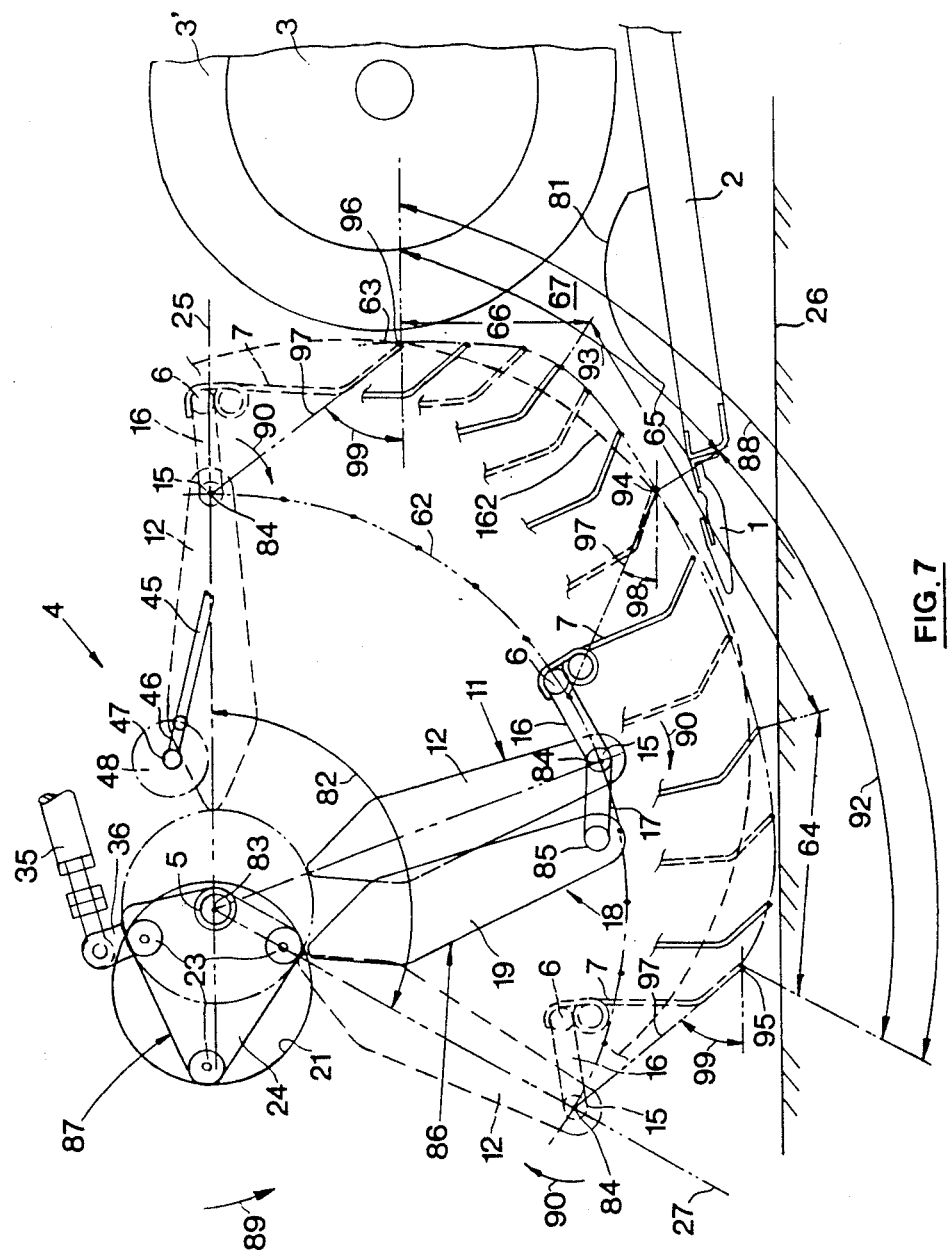
FIGS. 7 and 8 are schematical partial side elevational views similar to FIG. 1 but showing two different variations in oriéntation of the crop-engaging members in relation to the cutterbar and auger of the header, the movement of the crop-engaging members being schematically shown.
Figure 8:
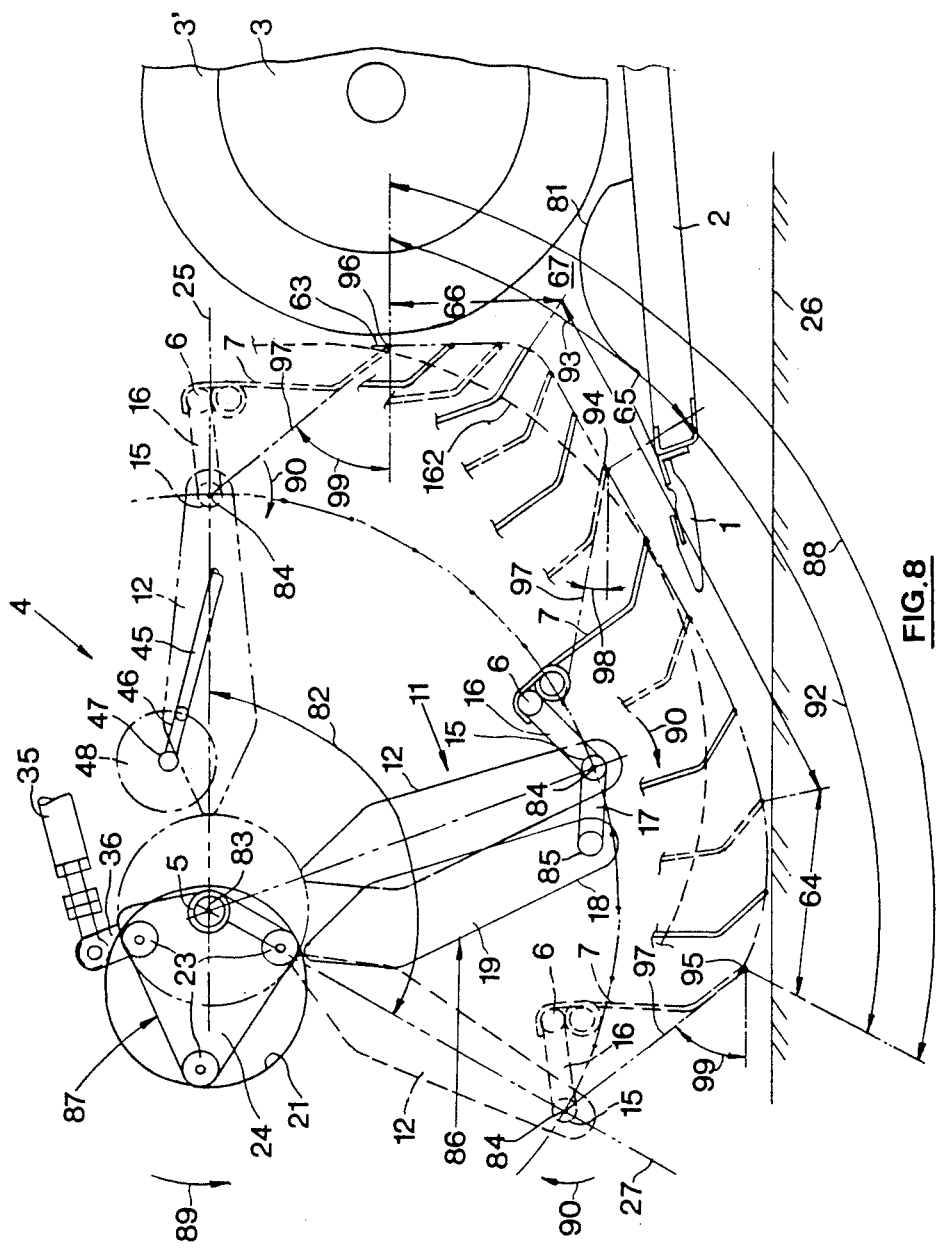

This operative arc 82 is shown in FIGS. 1, 7 and 8 by a line 25 extending from the axis 83 of the main shaft 5 toward the auger 3 and being generally parallel to the ground line 26, and a line 27 which is spaced 120 degrees back from the line 25. When the stub shafts 15 of one crop-engaging member 6, 7 coincide with the line 25, then the stub shafts 15 of another crop-engaging member 6, 7 of the same set of crop-engaging memberes 6, 7 coincide with the line 27. The portion of the locus 63 of the free ends of the tines 7 which corresponds with this operative arc 82 further will be referenced hereinafter with the reference 88. It will be appreciated that this operative section 88 of the locus 63 and the operative arc of operation 82 of the crop-engaging members 6, 7 are offset relative to each other to the extent that the free ends of the tines 7 are spaced at distance from the corresponding stub shafts 15.

The reel 4 is driven in the direction 89 by first drive means 28 comprising a drive pulley 29, which is rotatively driven from the combine harvester, a belt 31 extending from the drive pulley 29 over an idler pulley 32 to a pulley 33 mounted concentrically in the main shaft 5, and back to the pulley 29. On rotation of the drive pulley 29, the main shaft 5 is rotated by the pulley 33 and thus the spiders 11 and intermediate spiders and, therefore, also the crop-engaging members 6, 7 equally are rotated in said direction 89 around the main axis 83 of the rear 4. However, in view of the present of the crank plates 24 with the rollers 24 thereon and the eccentric spiders 18, forming the inclination control means 86, the crop-engaging members 6, 7 are caused to rotate, during said rotation of the reel 4 around the main axis 83 in the direction 89, by an equal angular displacement in the opposite direction 90 around the respective further axes 84 of the stub shafts 15, whereby the tine bars 6, and hence the tines 7 carried thereby, are maintained in a resultant nominal fixed orientation. The locus of the outer tips of the tines 7 under these operating conditions is a circle. This basic operation of thr reeel 4 is conventional.

However, during operation and provided the reel 4 is in an operative position close to the cutterbar 1, the angular position of the steering means 87 is varied continuously by a second drive means 34 associated therewith. The second drive means 34 are split into two indentical drives, one for each eccentric spider 18. Essentially, the second drive means 34 cause the steering means 87 to oscillate to advance and retard the rotation of the tine bars 6 about the corrsponding respective axes, so as to alter the nominal fixed orientation of the tines 79

With further reference to FIGS. 3 and 4, it can be seen that each drive of the second drive means 34 comprises an adjustable con rod 35 pivoted at one end to a lug 36 attached to the associated crank plate 24 and pivotally attached at the distal end by a pivot 37 to slide block 38 which is slidably mounted in slots 39 in a bifurcated arm 41 of a bell-crank lever 42, the con rod 35 passing between the bifurcations of the arm 41. Thus the upper pivot 37 of the bell-crank lever 42 is adjustably positioned by virture of the slide block 38 for a reason to be explained hereinafter. The central pivot 43 of the bell-crank lever 42 is provided on the associated reel arm 8, and the third bell-crank pivot 44 attached to one end of a rod 45, the detail end of which is pivotally attached to one end of a crank arm 46 (best seen in FIG. 5), the other end of which is attached to a crank shaft 47 carrying a sprocket a 48 driven by a chain 49 from a sprocket 51 attached to the main shaft 5 of the reel 4. The sprocket 51 has three times as many teeth as the sproket 48 whereby, for each revolution of the reel 4, the crank arm 46 makes three revolutions and hence the steering means 87 also makes three complete oscillations.

A pull rod 52, seen in FIGS. 3 and 4, is pivotally connected at one end to the pivot 37 and is disposed between the bifurcations of the bell-crank lever arm 41. The outer end of the pull rod 52 is pivotally connected at a pivot 53 to one end of a support link 54, which itself is pivotally attached at the other end to a lug 55 carried by the associated reel arm 8, and to one end of a rod 56 which is telescopically received in a tubes 57 which in turn is pivotally mounted at 58 on the associated side wall 91 of the header. A compression spring 59, seen in FIGS. 2 and 4, has one end hooked around the pivot 58 and the other end hooked over the end of the rod 56 which is in the form of a tube as shown in FIG. 4.

In use, the header is mounted on the combine harvester via a transverse beam .61 forming part of the header frame 2. The reel 4 is lowered to the required working height by contracting the hydraulic cylinders 9 on the respective sides of the header. In the fully lowered position of the reel 4, the slide blocks 38 of the two drives together forming the second drive means 34 are pused to the top of the respective bell-crank levers arms 41 by virtue of the rods 56 bottoming in the associated tubes 57 on lowering of the reel 4. This operative position is that illustrated in FIGS. 1 and 2 of the drawings.

When the crop is to be harvested, drive to the reel 4 is initiated and the latter rotates in the direction 89. If the second drive means 34 were inoperative, the tines 7 would be maintained in a nominal fixed orientation by the presence of the eccentric spiders 18 and the steering means 87 as already described. However, with the reel 4 in a lowered position relative to the cutterbar 1, the second drive means 34 are made operative as will be described below in further detail.

On rotation of the main shaft 5 of the reel 4, the sprockets 51 also are rotated and thus the sprockets 48 are driven so as to drive the crank shafts 47 and hence the crank arms 46. Rotation of the crank arms 46 reciprocates the associated rods 45 which in turn rocks the bell-crank levels 42 about the pivots 43. This rocking of the bell-crank levers 42 effects reciprocation of the con rods 35 which in turn rocks the associated crink plates 24 whereby the positional inclination of the tines 7 is varied. In view of the 3:1 ratio of the respective sets of sprockets 51 and 48, the bell-crank levers 42 are rocked three times per revolution of the reel 4, whereby the crank plates 24 also are rocked in the same manner so that the tines 7 are oscillated three times back-and-forth around the respective further axes 84 on the spider arms 12 per one revolution of the reel 4 around the main axis 83. In other words, one full oscillation cycle of the steering means 87 corresponds to one third or 120 degree of a full revolution of the reel 4. Furthermore, and as already explained, the operative arc 82 of the tine bars 6 as defined by the lines 25 and 27 also extends over an angle of 120 degrees. This operative arc 82 is the result of one oscillation cycle of the steering means 87.

From what precedes, it also will be appreciated that the movement of the reel tines 7 is accelerated during half of each oscillation cycle of the steering means 87 and decelerated during the other half of said oscillation cycle. The result thereof is that the locus 63 of the free ends of the tines 7 deviates from the conventional circular shape.

Figure 6:
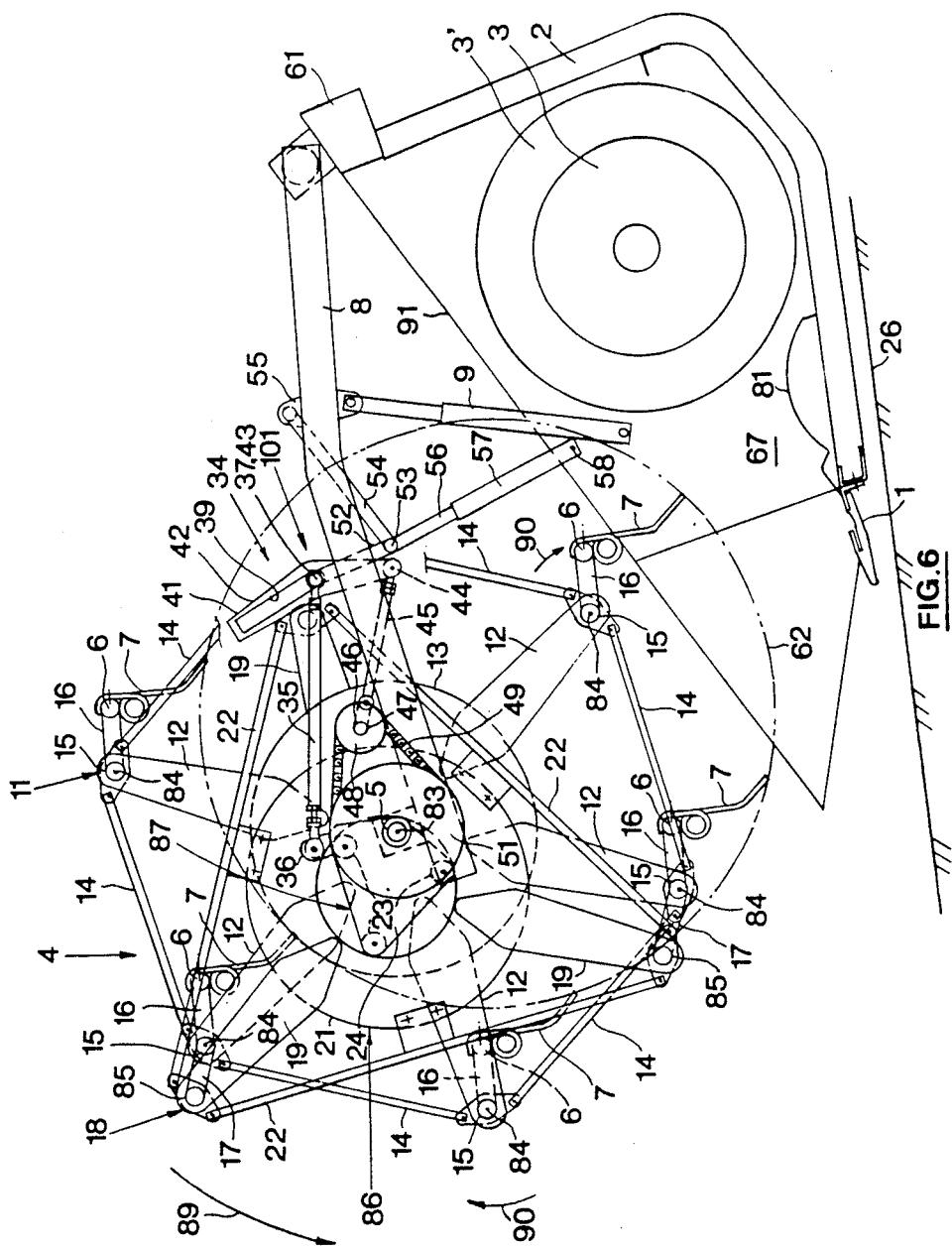
FIG. 6 is a schematic side elevational view of the header similar to that of FIG. 1, but showing some components in different relative positions.

If the crop conditions are good and there is, for example, and absence of flattened or down crop, then the combine harvester operator normally elects to raise the reel from the position shwon in FIG. 1 to an alternative operative position which is shown in FIG. 6. By this movement, the second drive means 34 are neutralized through the intermediary of drive neutralizing means 101 which saves wear on the drive components which are thereby arrested, and also efrects a saving in power consumption. This neutralizing of the second drive means 34 is effected as follows. When the reel arms 8 are raised, the bell-crank levers 42 also are raised but the respective slide blocks 38 are held stationary by the springs 59 which are presently in extension. Thus, the bell-crank levers 42 move past the slide blocks 38 until such time as the slide block pivots 37 coincide with the respective central bell-crank pivots 43. At this point, no further relative movement between the bell-crank levers 42 and the slide blocks 38 is possible so that continued raising of the reel arms 8 pulls the rods 56 out of the tubes 57.

It will be appreciated that the arresting of the relative movement between the bell-crank levers 42 and the slide blocks 38 is effected by the latter bottoming in the slots 39 in the bell-crank arms 41. It will also be appreciated that, when the respective pairs of pivots 37 and 43 coincide, the rocking of the bell-crank levers 42 upon rotation of the reel 4 (this part of the drive not being neutralized) no longer causes reciprocation of the con rods 35 whereby the second drive means 34 becomes neutralized.

Returning briefly to FIG. 6 of the drawings, it will be seen that the locus 62 of the outer tips of the tines 7 is a circle which is as with a conventional header. However, FIGS. 1, 7 and 8 illustrate the non-circular loci 63 which result from the present invention. These loci 63 comprise the operative section 88 as already described and which basically is the section wherein the tines 7 engage crop material and sweep it across the cutterbar in a generally rearward direction to finally release said crop material at a location rearwardly of the cutterbar 1 and in front of the auger 3. The operative section 88 of the non-circular locus 63 basically has three distinct portions, the first portions 64 of which being arcuate but lying close to the ground 26 in order to pick up any flattened crop. The following portion 65 of the operative section 88 of the locus 63 is seen to be substantially linear and extends upwardly from the first portion 64 very close above the cutterbar 1. The final portion 66 of the operative section 88 of the locus 63 which follows the second portion 65 is also substantially linear and extends generally vertically very close to the forward edge of the auger 3 to which the crop material cut by the cutterbar 1 needs to be transported in an efficient manner.

The transition between the second and third portions 65 and 66 extends into the generally triangular (as seen in slide view) dead space 67 which traditionally exists between the cutterbar 1 and the auger 3 of a header. This extension into the dead space 67 helps to clear, at least to a better extent than normal, any crop material which tends to lodge in this space. It will be seen from FIG. 8 when compared with FIG. 7 that a larger oscillation stroke of the steering means 87 causes the tines 7 to sweep deeper into the dead space 67 and is such as make the second and third portions 65, 66 of the operative section 88 of the locus 63 more linear.

It will be appreciated that the tines 7 preferably should be oriented gererally vertically when they enter into the crop material at the forward end of the operative section 88 of the locus 63 so as to facilitate this entrance, especially when the crop material is flattened, and to reduce cutterbar losses, i.e. grain losses occurring in front of the cutterbar 1 due to among other reasons the reel components shaking grain kernels out of the crop material before entering the header. Similarly the reel tines 7 preferably also should be oriented generally vertically at the rearward end of the operative section 88 of the locus 63 so as to facilitate the release of crop material to the auger 3. However, inbetween these two extreme positions the reel tines 7 preferably should be generally inclined relative to vertical in a manner to facilitate lifting of the crop material and positively conveying it across the cutterbar 1 in a rearward direction.

These desirable features can be obtained by the reel under consideration by timing the first and second drive means 28, 34 so that, in the operative section 88 of the locus 63, the movement of the tines 7 changes from an accelerated to a decelerated movement at a location 94 generally vertically above the cutterbar 1 with the positional inclination of the crop-engaging members and more specifically of the reel tines 7 thereof relative to the horizontal being the smallest at this location. In other words, the steering means 87 pass through an extreme position when the reel tines 7 pass across the cutterbar 1. Furthermore, the operative section 88 of the non-circular locus 63, i.e. the section of the locus 63 where the reel tines 7 are in contact with the crop material, should correspond substantially with one full oscillation cycle of the steering means 87. Thus, the steering means 87 start from one extreme position when the reel tines 7 are at the forward end 95 of said operative section 88 of the locus 63 and pass via the other extreme position (when the reel tines 7 are position generally vertically above the cutterbar 1) to finally return to the first extreme position when the reel tines 7 are at the rearward end 96 of the operative section 88 of the locus 63.

Accordingly, the portion 92 of the non-circular locus 63 associated with the half of said one full oscillation cycle wherein the crop-engaging members 6, 7 are accelerated, is positioned generally in front of the cutterbar 1 and the portion 93 of the non-circular locus 63 associated with the half of said one full oscillation cycle wherein the crop-engaging members 6, 7 are decelerated, is positioned generally rearwardly of the cutterbar 1. The reel tines 7, when in their position of maximum inclination relative to the horizontal at or proximate to the rearward end 96 of the operative section 88 of the locus 63, have their free ends located generally proximate to the forward edge of the header auger 3 so that the portion 93 of the operative section 88 of the locus 63 wherein the reel tines 7 are decelerated, extends generally between the cutterbar 1 and the header auger 3.

Returning now briefly to the transition between the second and third portions 65 and 66 of the locus 63 as already described, it will also be appreciated that, at this transition, the straight line 97 between the free end of the reel tines 7 and the further pivot axis 84 of said reel tines 7 on the reel 4 (as seen in side view of the reel) should be aligned with the radius of the reel 4 extending between the main axis 83 and said further axis 84, whereby maximum penetration of the reel tines 7 into the dead space 67 is obtained. This is obtained by proper dimensioning and positioning of various components of the reel as will be appreciated. Also the timing of the first and second drive means 28, and 34 sahould be such that this alignment between the radius of the reel and said straight line 97 is obtained when the reel tines 7 have their free ends positioned substantially midway between the cutterbar 1 and the forward edge of the header auger 3. This alignment is obtained upon completion of substantially three quarters of the oscillation cycle of the steering means 87.

To illustrate the difference in the depth of penetration of the reel tines into the crop transfer zone 67 when comparing a conventional header with the header embodying the present invention, the circular locus 162 of a conventional reel also has been added in FIGS. 1, 7 and 8 illustrating the non-circular locus 63 of the arrangement according to the present invention. Both loci 63 and 162 are positioned in the close vicinity of both the cutterbar 1 and the auger 3.

When positioned with their free ends at the turning point 94 of the locus 63, i.e. at the position where the accelerated movement of the reel tines 7 turns into a decelerated movement, or where the reel tines 7 are at their maximum positional inclination relative to the vertical, the reel tines 7 are oriented so that the straight line 97 between said free ends of the reel tines 7 and the associated further pivot axes 84 defines an angle 98 in the range of between 0 and 20 degrees relative to the horizontal. When positioned in the positions 95, 96 corresponding with the start and end of an oscillation cycle of the steering means 87, i.e. at the position where the reel tines 7 are at their minimum positional inclination relative to the vertical, said straight line 97 defines an angle 99 in the range of between 30 and 60 degrees with the horizontal.

It will be appreciated that, by virtue of the tine bars 6 being mounted via crank arm 16 in offset relationship relative to the respective further pivot axes 84, the main dimension of the reel tines 7 is inclined at a different angle relative to the horizontal than said straight line 97 between the free ends of the tines 7 and the associated further azes 84. To the extent that the aforementioned offset is in the direction toward the auger 3, said main dimension of the reel tines 7 always is inclined at a steeper angle relative to the horizontal than said straight line 97. By this offsetting of the reel tines 7 it has become possible to orient said reel tines 7 so that, when positioned in the vicinity of the cutterbar 1, the main dimension of said reel tines 7 is oriented generally perpendicularly to the non-circular locus 63 at this location. This is advantageous to the extent that, when the tines are excessively loaded over this portion of the locus 63 and thus are flexed against their general direction of movement, they will not interfere with the cutterbar 1.

As described above, each steering means 87 controls the oscillating movement of three tine bars 6 which are spaced apart 120 degrees. The steering means 87 also completes three cycles per one revolution of the reel 4. One oscillation cycle of the steering means 87 thus corresponds to one third or 120 degrees of a full revolution of the reel 4. This relationship between the number of tine bars 6 of which the angular position is controlled by a steering means 87 on the one hand and the number of oscillations of this steering means 87 on the other hand is essential to ensure that the operative section 88 of the locus 63 always remains properly positioned relative to the cutterbar 1 and the auger 3.

This condition can be stated in the following more general terms. Each steering means 87, which controls the angular position of n tine bars 6 having their respective further pivot axes 84 equiangularly spaced around the main axis 83 of the reel 4, also should complete n oscillation cycles during one full revolution of the reel 4. Thus, one oscillation cycle of the steering means 87 corresponds to 360/n degrees of a full revolution of the reel and, as this 360/n degrees generally should correspond to the operative section 88 of the locus 63, it will be appreciated that n in this formula cannot vary widely. From a practical viewpoint, n may equal only 2, 3, 4 or 5 with 3 clearly being the preferred value.

As alredy mentioned, the tine bars 6 are divided into two sets such that one tine bar 6 of one set alternates with one tine bar 6 of the other set. Stated otherwise, one tine bar 6 of one set is positioned precisely in the middle between two tine bars 6 of the other set. In the preferred embodiment illustrated in the drawings, the two sets of tine bars 6 are 60 degrees offset relative to each other. This offsetting of the tine bars 6 of both sets also necessitates a corresponding timing of the oscillations of the respective steering means 87 to the extent that, when one tine bar 6 of one set is positioned at the turning point 94 of the locus 63 above the cutterbar 1, the adjacent tine bars 6 of the other set are positioned at the forward, respectively rearward ends 95 and 96 of the operative section 88 of the locus 63. As already mentioned, the tines 7, when positioned with their free ends at the turning point 94 of the locus 63, assume a maximum positional inclination relative to the vertical and, when positioned at the forward or rearward ends 95, 96 of the operative section 88 of the locus 63, assume a minimum positional inclination relative to the vertical.

Accordingly, when one steering means 87 associated with the one set of tine bars 6 is in one extreme position, the other steering means 87 associated with the other set of tine bars 6 should be in the other extreme position. This also means that the cranks 46 of the second drive means 34 on both sides of the reel 4 should be 180 degrees out of phase. If this 20 requirement is respected, the loci 63 of the reel tines 6 associated with both sets of tine bars 6 overlap each other as will be appreciated. Thus all crop-engaging members 6, 7 and identically positioned operative arcs 88 of the loci 63 in the cutterbar area.

Keeping in mind that all tines 7, of which the positional inclination is controlled by one and the same steering means 87, at all times assume identical positional inclinations, it also can be derived from the foregoing that, when one tine bar 6 has its tines 7 positioned at the turning point 94 of the locus 63, all tines 7 of one set of tine bars 6 assume one positional inclination which is different from the positional inclination of the tines 7 of the other set of tine bars 6. The foregoing is illustrated in the FIGS. 7 and 8. However, as the reel 4 rotates further in the direction 89, the foregoing changes and, when the tines 7 of one tine bar 6 have their free ends at the point of maximum penetration into the dead space 67, i.e. when the oscillation cycle of the corresponding steering means 87 is ¾ complete, all tines 7 of both sets of tines bars 6 have the same intermediate positional inclination. This condition is illustrated in FIG. 1.

The nominal fixed orientation of the tines 7 is set by angular adjustment of the crank plates 24 about the main shaft 5 of the reel 4. The adjustability of the con rods 35 enables this initial nominal orientation to be set as required. The extent of rocking movement of the bell-crank levers 42, and hence the extent of oscillation of the crank plates 24, can be determined by the length of the crank arms 46 and FIGS. 7 and 8 illustrate two different extents of said oscillating movement, said Figures illustrating an overall stroke of the steering means 87, or respectively 30 degrees and 40 degrees.

It will be seen that the employment of the foregoing arrangement presents the tines 7 over the operative arc 88 adjacent the cutterbar 1 and auger 3 in an optimum manner in order to fulfil the three basic requirements of lifting flattened crop, taking it close to the cutterbar 1 for cutting, and transporting cut crop as close as possible to the auger 3 before disengaging it. In the latter respect, it will be noted that, during operation, the tines 7 initially have their main dimension oriented generally vertically and have their operative ends moving downwardly along a generally vertical section of the locus 63 when entering the crop material on the field, specific reference being made to the section of the locus 63 immediately forwardly of the portion 88 in FIG. 1. This movement quickly changes into a generally rearwardly and horizontally directed movement in the section 64 of the locus 63 while that, at first, the general orientation of the tines remains substantially the same, i.e. with the main dimension oriented generally vertically. The foregoing taken in combination with the forward movement of the combine harvester ensures that the reel tines 7 enter the crop material smoothly whereby cutterbar losses are reduced and the reel tines 7 positively engage the crop material without any hesitation for subsequently lifting and conveying said crop material.

Thereafter, the rearward movement of the reel tines 7 gradually changes into a slightly upwardly and rearwardly directed movement while that the tines 7 equally gradually are inclined towards an inclined orientation for providing a scooping effect whereby crop material is presented in a positive manner to the cutterbar 1 for cutting and subsequently is conveyed rearwardly over the cutterbar equally in a positive manner. As the movement of the reel tines 7 changes from a generally rearward movement into a generally vertical movement at the transition from section 65 to section 66 of the locus 63, said reel tines 7 penetrate much deeper into the dead zone 67 than is conventional, whereby possible hesitation in the transfer of crop material from the cutterbar 1 to the auger 3 is greatly reduced.

Simultaneously as the reel tines 7 move rearwardly beyond the cutterbar 1, the orientation of said tines 7 gradually returns to a generally vertical orientation. This generally vertical orientation combined with the upward movement in a generally vertical direction of the reel tines 7 in the last portion 66 of the operative section 88 of the locus 63 and in the immediate vicinity of the forward edge of the auger 3 effects a clean disengagement of the crop material so that the latter is not carried around the reel 4 by the tines 7 and a smooth transfer of the crop material to the auger 3 is guaranteed.

It will be appreciated from the foregoing description that the splitting of the tine bars 6 into two sets in order to provide an adequate operative arc of the tines 7 over which the necessary variation in orientation of the tines 7 can be effected is a significant advance. It will be appreciated that, although in the embodiment illustrated in the present drawings the two sets of tines are driven from respective ends of the header, the drive also can in fact be effected from the same end. Nevertheless, space and weight considerations make it more convenient to arrange the drive as described in the illustrated embodiment.

Figure 9:
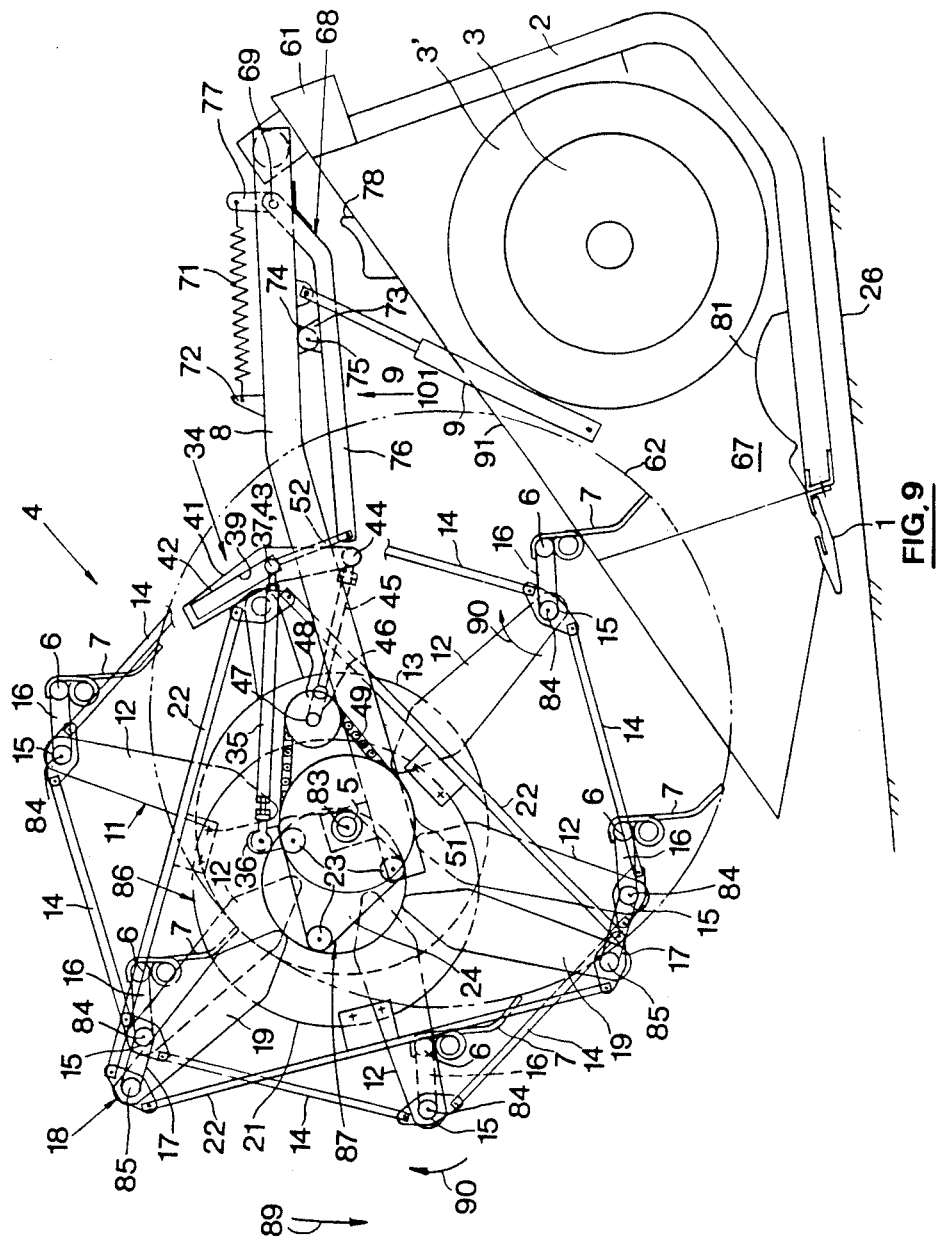
FIG. 9 is a schematic side elevational view of the header similar to FIG. 6, but showing a second embodiment of the header.

Turning now to FIG. 9, this shows an alternative arrangement of the drive neutralizing means 101 associated with the second drive means 34. The basic construction of the header is as in the first embodiment and like components are allocated similar reference numerals. The second drive means 34 comprises as before, two identical drives and these are generally constructed in the same manner as with the first embodiment, the difference being that each telescopic arrangement 56, 57 and spring 59 are replaced by a bell-crank lever 68, which is pivotally mounted on the associated reel arm 8 at 69 and of which one arm is pivoted to the associated pull rod 52 and the other arm has attached thereto one end of a spring 71, the other end of which is attached to a lug 72 connected to the corresponding reel arm 8.

FIG. 9 shows the second drive means 34 in the neutralizd position which has already been described in respect of the embodiment of FIGS. 1 to 6. This position is obtained by the springs 71 urging the bell-crank levers 68 in the anti-clockwise direction, as seen in FIG. 9, until the pivots 37 and 43 coincide. When the reel 4 is lowered in a direction toward the cutterbar 1 by contracting the hydraulic cylinders 9, the arms 76 of the bell-crank levers 68 eventually engage corresponding stops 78 on the header. Continued lowering of the reel 4 subsequently results in the bell-crank levers 68 pivoting in the clockwise direction, as seen in FIG. 9, whereby the rods 52 push the slide blocks 38 upwardly within the slots 39 whereby the further or second drive means 34 are activated. This activated condition is obtained when the reel 4 is positioned with its tine path in close proximity to and above the cutterbar 1. Thus, the second drive means 34 is neutralized and rendered operative automatically, as with the first embodiment, upon raising and lowering of the reel 4, respectively.

However, with the alternative embodiment of FIG. 9, the second drive means 34 also can be neutralized even with the reel 4 in the lowermost position which is shown in FIG. 1 of the drawings. This is because, when the arms 76 of the bell-crank levers 68 are lowered relative to the reel arms 8 either by actually raising the reel 4 as if the neutralizing of the second drive means 34 is to be effected automatically as in normal operation, or by manually forcing the arms 76 downwardly, then, when the arms 76 are in the position shown in FIG. 9, a pin 75 can be inserted in aligned apertures provided in a lug 73 attached to each arm 76 and a lug 74 attached to the corresponding reel arm 8, whereby the bell-crank levers 68 are locked in the neutralizing position.

If the movement of the bell-crank levers 68 has been effected by raising the reel 4, the latter can now be lowered to the operative position of FIG. 1 and no relative movement between the reel arms 8 and the bell-crank levers 68 will take place so that the neutralization of the second drive means 34 is made permanent. It will be appreciated that, when the bell crank levers 68 are locked in the neutralizing position, it also is necessary to either remove or shift the stops 78 so as to permit a lowering of the reel 4 toward its position in close proximity of the cutterbar 1. This option of neutralizing the second drive means 34 even in the lowermost position of the reel 4 is not possible with the embodiment of FIGS. 1 to 6.

It will be understood that changes to the details, materials, steps and arrangements of parts which have been described and illustrated to explain the nature of this invention will occur to and may be made by those skilled in the art upon a reading of this disclosure within the principles and scope of the invention. The foregoing description illustrates two embodiments of the invention; however, concepts, as based upon the description may be employed in other embodiments without departing from the scope of the invention. For example, it will be appreciated that, in a simpler form, the drive neutralizing means 101 may consist of a disengageable coupling means provided within the second drive means 34 and which are arranged so that, when the coupling means are disengaged, the steering means 87 are positionable in a fixed position.

Such disengageable coupling means may be operable either manually or automatically. When operable automatically, the coupling means could be operated by the raising and lowering of the reel 4 relative to the cutterbar 1, the arrangement being such that, as the reel 4 is raised from its lowermost operative position, the coupling means are disengaged and the steering means 87 are positioned in a fixed nominal position and, as the reel 4 is lowered toward its lowermost operative position, the coupling means are engaged to permit the further drive means 34 to oscillate said steering means.

It will also be appreciated from the foregoing description that the present invention affords a significant advance in the art of presenting crop material to the cutterbar of a header and transporting cut crop material to the header' auger, whereby harvesting efficiency is considerably increased. Nevertheless, when the crop condition is such that less attention need be paid to the presentation of the crop to the cutterbar 1, whereby the reel 4 can be raised to the position of FIG. 6, then the second drive means 34 can be neutralized thus effecting a saving in power consumption and component wear.

Having thus described the invention, what is claimed is:

1. A header for an agricultural machine comprising:
a cutterbar operable to cut standing crop;
a rotatable reel having a transverse shaft defining a main axis of rotation thereof and including a plurality of crop-engaging members rotatably mounted thereon to be rotatable about respective pivot axes disposed around the main axis of rotation;
first drive means for rotatably driving the reel in one direction;
inclination control means for controlling the orientation of the crop-engaging members with respect to said pivot axes, said inclination control means including steering means operable, during rotation of the reel in said one direction, to rotate the crop-engaging members around the respective pivot axes in a second direction opposite to said one direction so as to maintain the crop-engaging members at a fixed orientation relative to the horizontal such that the free ends of the crop engaging members define a circularly shaped locus;
second drive means associated with the steering means for oscillating said steering means during rotation of the reel whereby the crop-engaging members are oscillated around their respective pivot axes on the reel and the locus defined by the path of movement of the free ends of said crop-engaging members deviates from said circular shape; and neutralizing means operably connected to said second drive means to permit a selective disengagement of said second drive means to prevent an oscillation of said steering means.

2. The header according to claim 1 wherein the means for neutralizing the second drive means are formed by disengageable coupling means provided within said second drive means, such that, when the coupling means are disengaged, the steering means are positionable in a fixed position.

3. The header according to claim 2 wherein the disengageable coupling means are operable manually.

4. The header according to claim 2 wherein the disengageable coupling means are operable in response to a raising and lowering of the reel relative to the cutterbar, such that, as the reel is raised from its lowermost operative position, the coupling means are disengaged and the steering means are positioned in a fixed nominal position and, as the reel is lowered toward its lowermost operative position, the coupling means are engaged to permit the second drive means to oscillate said steering means.

5. The header according to claim 1 wherein the second drive means includes a linkage mechanism having an oscillating member mounted for oscillatory movement on the header and arranged to be oscillated in synchronism with the rotation of the reel, and a link connected between the oscillating member and the steering means of the inclination control means, said neutralizing means including a slide which is slidably coupled relative to the oscillating member and accomodating a slide pivot by which one end of the link is attached thereto to adjustably couple said link to said oscillating member, such that, when the slide pivot is offset from a rocking pivot of the oscillating member, the second drive means is made operative and, when the slide pivot is aligned with said rocking pivot of the oscillating member, the second drive means is neutralized.

6. The header according to claim 5 wherein the oscillating member is formed by a bell-crank lever mounted for oscillatory movement on the header, said slide being slidably coupled to one arm of said bell-crank lever between the rocking pivot htereof and a position at a distance from said rocking pivot, the bell-crank lever receiving driving power at the other arm to oscillate said bell-crank lever in synchronism with the rotation of the reel.

7. The header according to claim 6 wherein the linkage mechanism of the second drive means also includes a crank which is drivingly coupled to the reel shaft to receive rotational driving power therefrom, said crank also being operatively coupled to said other arm of the bell-crank lever so as to translate rotational movement of the crank into oscillatory movement of the bell-crank lever.

8. The header according to claim 7 wherein the oscillating member completes a plurality of oscillations for each revolution of said reel.

9. The header according to claim 7 wherein said one arm of the bell-crank lever is bifurcated with each bifurcation being slotted.

10. The header according to claim 9 further comprising:
  reel supporting means adjustably supporting the reel on the header frame to which the cutterbar is attached so as to permit generally vertical adjustment of the reel relative to the cutterbar, said reel supporting means also supporting the second drive means including the bell-crank lever; and
  position control means coupled between the slide and the header frame for automatically neutralizing the second drive means when the reel is raised from its lowermost operative position and for automatically activating said second drive means when the reel is lowered toward its lowermost operative position.

11. The header according to claim 10 wherein the position control means includes a telescopic member and a tension spring associated therewith for urging the telescopic member toward its contracted position, the telescopic member being provided between the slide and the header frame so that the spring force is operable to urge the slide toward the position in alignment with the rocking axis of the bell-crank lever while permitting extension of the telescopic member when the reel is raised relative to the cutterbar to thereby nneutralize the second drive means, the telescopic member being operable to urge the slide toward an operative position spaced from the rocking axis of the bell-crank lever when said telescopic member reaches its fully contracted position when the reel is lowered toward its lowermost operative position relative to the cutterbar thereby activating the second drive means.

12. The header according to claim 11 wherein the position control means also includes a pull rod pivotally coupled at one end to the slide and at the opposite end thereof to the telescopic member, the pull rod having a length which substantially corresponds to the length of the stroke of the slide along the one arm of the bell-crank lever.

13. The header according to claim 12 wherein the position control means also includes a support link pivotally coupled at one end to the reel supporting means and at the other end to the telescopic member for stabilizing the position of said telescopic member.

14. The header according to claim 9 further comprising:
  reel supporting means adjustably supporting the reel on the header frame to which the cutterbar is attached so as to permit generally vertical afjustment of the reel relative to the cutterbar, the reel supporting means also supporting the second drive means including the bell-crank lever and the position control means for the slide of the second drive means, said position control means including a bell-crank mechanism pivotally mounted intermediate its ends on the reel supporting means and pivotally connecxted at one end via a pull rod to the slide and a tension spring extending between the other end of said bell-crank mechanism and a fixation point on the reel suppoting means, said tension spring being operable to urge the bell-crank mechanism in a direction for moving the slide toward a position in alignment with the rocking axis of the bell-crank lever when the reel is raised from its lowermost position to neutralize the second drive means, said bell-crank mechanism being engageable with a stop when the reel is lowered toward its lowermost operative position to pivot said bell-crank mechanism in a direction opposite to the spring force so that the slide is moved toward an operative position spaced from the rocking axis of the bell-crank lever to thereby activate the second drive means.

15. The header according to claim 14 wherein the bell-crank mechanism is fixedly connectable to the reel supporting means in a position wherein the slide is aligned with the rocking axis of the bell-crank lever so that the second drive means remains neutralized even when the reel is positioned in its lowermost operative position relative to the cutterbar.

16. The header according to claim 15 wherein the crop-engaging members are divided into two sets such that one crop-engaging member of one set alternates with one crop-engaging member of the other set; said second drive means, said inclination control means including said steering means and said neutralizing means being independently associated with each set of crop-engaging members.

* * * * *